Jan. 12, 1971     D. B. MILLIKEN     3,554,635

TRANSPORT MECHANISM

Filed March 11, 1968     3 Sheets-Sheet 1

INVENTOR.
DONALD B. MILLIKEN
BY
Christie, Parker & Hale
ATTORNEYS

Jan. 12, 1971 D. B. MILLIKEN 3,554,635
TRANSPORT MECHANISM
Filed March 11, 1968 3 Sheets-Sheet 2
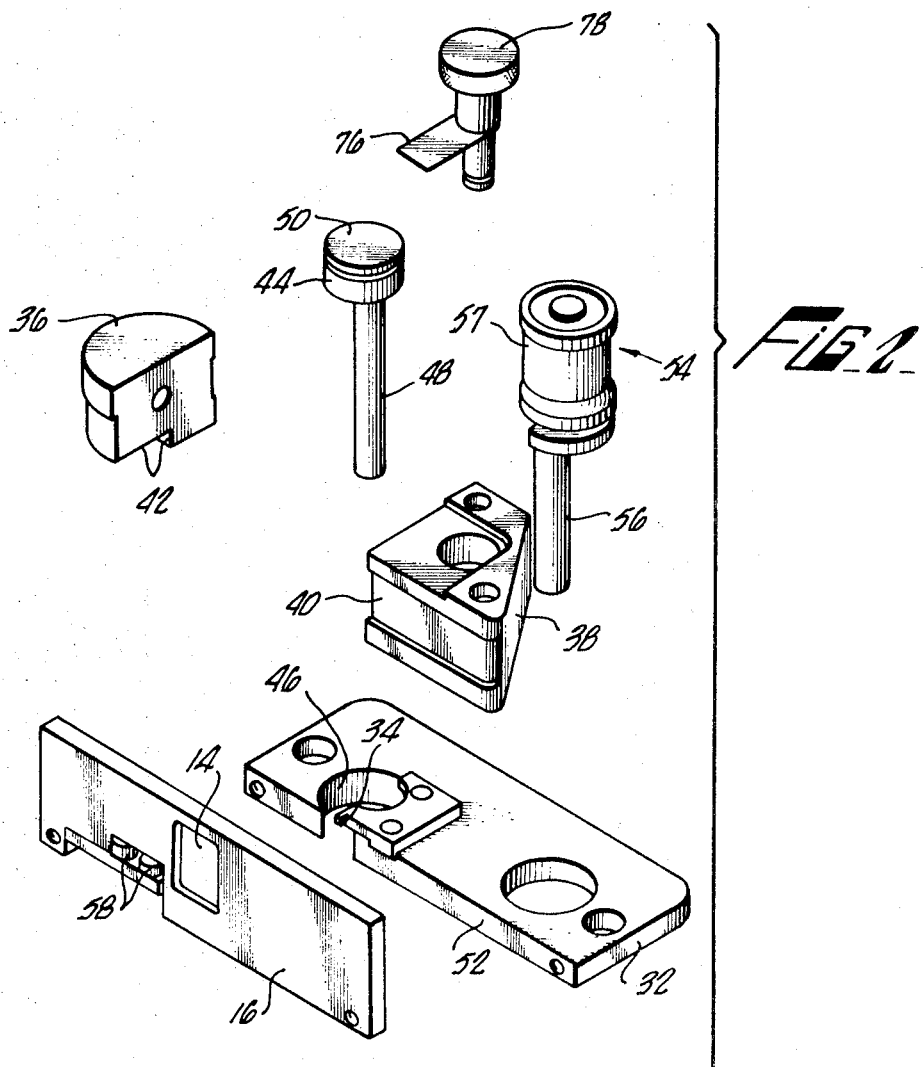
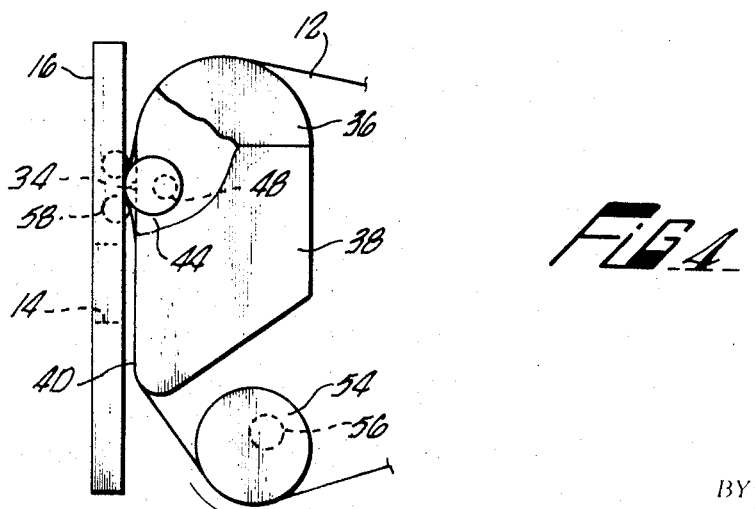
INVENTOR.
DONALD B. MILLIKEN
BY
Christie, Parker & Hale
ATTORNEYS

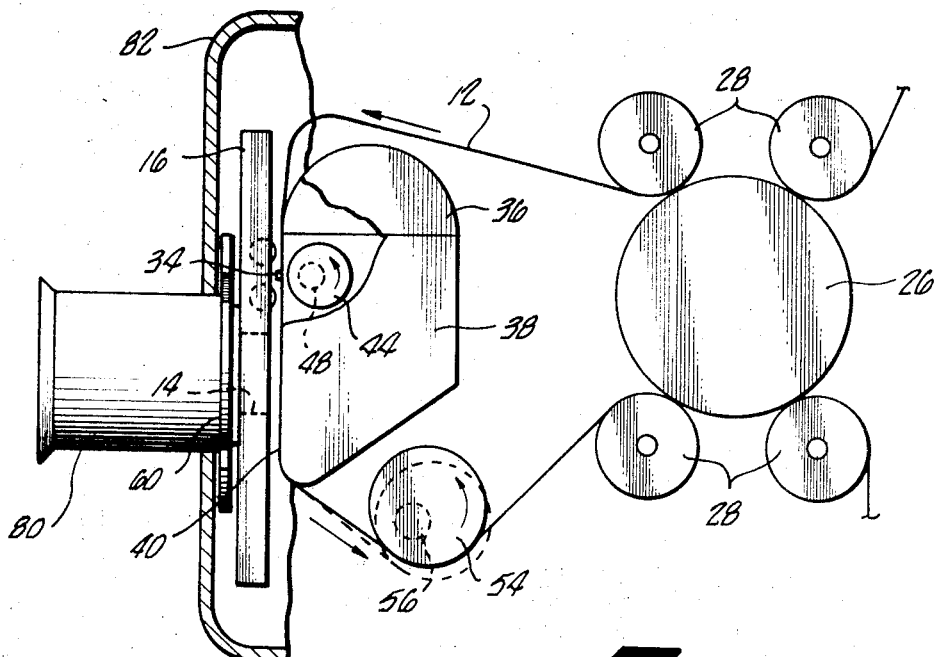
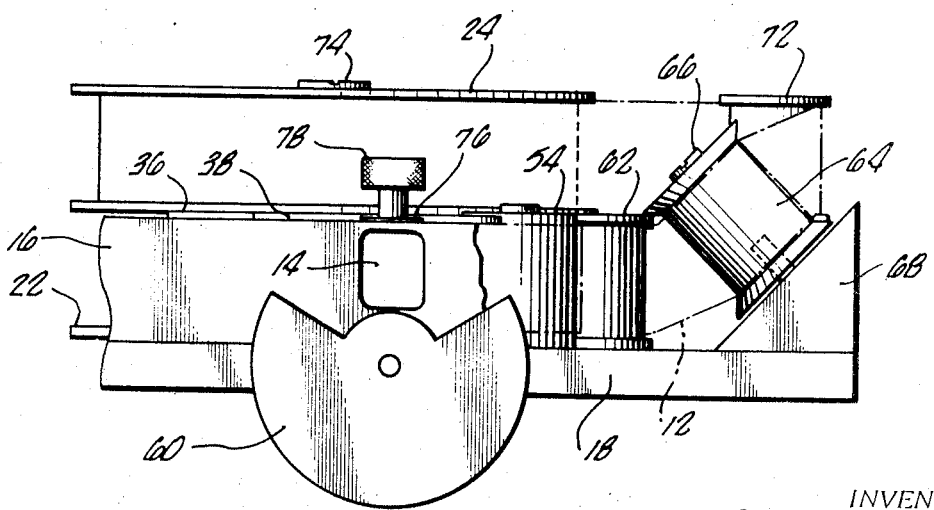

United States Patent Office 3,554,635
Patented Jan. 12, 1971

3,554,635
TRANSPORT MECHANISM
Donald B. Milliken, Altadena, Calif., assignor, by mesne assignments, to Teledyne, Inc., Los Angeles, Calif., a corporation of Delaware
Filed Mar. 11, 1968, Ser. No. 712,116
Int. Cl. G03b 1/34
U.S. Cl. 352—184                    2 Claims

ABSTRACT OF THE DISCLOSURE

A transport mechanism for intermittently moving an elongated, flexible length of material past a location and for positively indexing a portion of the material at that location while it is not in motion. A stationary index pin secured to a mounting plate engages perforations in the material and a rotatable cam adjacent the index pin periodically disengages the material and the pin. After the two have been disengaged, a second rotatable cam moves a predetermined length of the material past the pin. During this motion the first cam ceases to bias the material away from the pin such that the pin engage another perforation after the predetermined length of material has been transported past it.

BACKGROUND OF THE INVENTION

Field of the invention

This invention relates to transport mechanisms for intermittently moving elongated lengths of material past a fixed location. Although the apparatus can be used for so transporting any type or form of such a material, it is particularly well suited for transporting photographic film past an optic.

State of the prior art

Intermittent transport mechanisms for band or tape-like materials are presently widely used. One of their most common applications is the transport of photographic film past an optic in a motion picture camera or projector. To obtain the motion picture effect the usually perforated film must be briefly stopped adjacent the optic before it is moved an additional step. The positioning of the film adjacent the optic must be correct and accurate to assure a satisfactory taking or projecting of a picture.

Most commonly, prior art intermittent transport mechanisms provide moving claws or pins which engage perforations of the band material being transported. The claws are generally actuated by a crank mechanism which reciprocates them over a predetermined length. They engage the perforations and move the film in one direction. At the termination of the movement the claws maintain the band material stationary for the required length of time. Thereafter the claws return to their original position to repeat the cycle.

Other transport mechanisms provide stationary or retractable pins which position the band material while it is not in motion. They may include pusher arms to disengage the material from the pin to permit the material to move another increment.

Both of these incremental transport mechanisms are relatively expensive to construct because they require intricate component parts to translate originally rotary motion into the required reciprocating motion. They also require a good deal of costly maintenance. They are not very well suited for high speed operation since friction between them and the moving band material causes heat build-ups which can ultimately damage or break the band. The heat build-up during high speed operation can also cause deposits of thermoplastic film materials which build up and result in the malfunctioning of the transport mechanism. Moreover, material strengths, especially of the reciprocating portions of mechanism, set a limit to the speed at which the mechanism can be operated.

The band material transported by the mechanism, especially where the material is photographic film in a compact motion picture camera, is transported between pairs of storage reels. To save space, it is desirable to coaxially mount these reels which requires that the film be offset in moving between reels. At some point between the two reels the film therefore does not move parallel to its longitudinal axis. In the prior art, the film is loosely looped over a roller which has an axial length about equal to twice the width of the film such that the film can be taken up by one of the reels as it is reeled off the other. This portion of the transport mechanism is relatively bulky and requires a substantial amount of guides to prevent the loosely looped film from becoming disengaged from the roller. During high speed operations this arrangement is not always satisfactory.

SUMMARY OF THE INVENTION

The present invention provides an apparatus for intermittently transporting a flexible, elongated length of material which has regularly spaced perforations, and for accurately positioning the material. Briefly, the apparatus includes a support structure and registering means fixed thereto. The registering means positions the material relative to the support. The material is arranged to flex towards the registering means when subjected to a tensional force in the direction of its length. Rotatable means are provided for intermittently biasing the material away from the registering means. Transport means subjects the material adjacent the registering means to a force in the direction of movement of the material when the registering means and the material are disengaged.

In its preferred embodiment, this transport mechanism is installed in a motion picture camera or projector and the material being transported is perforated photographic film. The term "film" as used in this specification therefore does not limit the use of the apparatus of this invention to the transport of photographic film but is merely descriptive of a particular application. It can, of course, be replaced with any tape or band-like material provided with perforations irrespective of the use to which it is put.

In the preferred embodiment, the registering means includes a register pin secured to a guide plate past which the film is transported. The rotatable means includes a continuously rotating first cam adjacent the pin which intermittently disengages the film and the pin. After they are disengaged, a rotating second cam of the transport means moves the film past the guide plate until the film is positioned to permit the register pin to engage another perforation. The second cam is arranged so that it applies a tensional force to the film between it and the register pin and thereby biases the film in opposition to the first cam towards the pin and the guide plate. Retraction of the first cam and the pin engaging bias of the film assure the proper positioning of the film while it is stationary.

There is no or only a negligible amount of sliding engagement between most components of the transport mechanism, particularly the first and second cams and the film. Instead, the components roll on the film as the film moves past them. Heat generation and possible damage to the film from friction is thereby substantially reduced. This makes the apparatus ideally adapted for high speed operations. Reciprocating movements of component parts have been eliminated to simplify the mechanism, make it more economical to construct and to reduce maintenance.

The present invention also contemplates the mounting of storage reels in an adjacent coaxial fashion. It provides a climbing loop roller which has an axis inclined to the axis of the reels to transfer the film from one plane to another. The climbing roller engages the film while its faces are angularly inclined from portions of the film on the reels or in the transport mechanism proper. The roller maintains the film taut, and is simple and inexpensive to construct. It permits high speed operation without the danger of losing the guidance of the film or of it becoming disengaged from the roller.

BRIEF DESCRIPTION OF THE DRAWINGS

FIG. 2 is an exploded view of portions of the mechanism shown in FIG. 1;

FIG. 3 is a fragmentary plan view of the transport mechanism showing the film adjacent an optic while it is stationary;

FIG. 4 is a view similar to FIG. 3 but showing the film while it moves past the optic; and FIG. 5 is a fragmentary elevational view taken on line 5—5 of FIG. 1.

DESCRIPTION OF THE PREFERRED EMBODIMENTS

Figure 1:
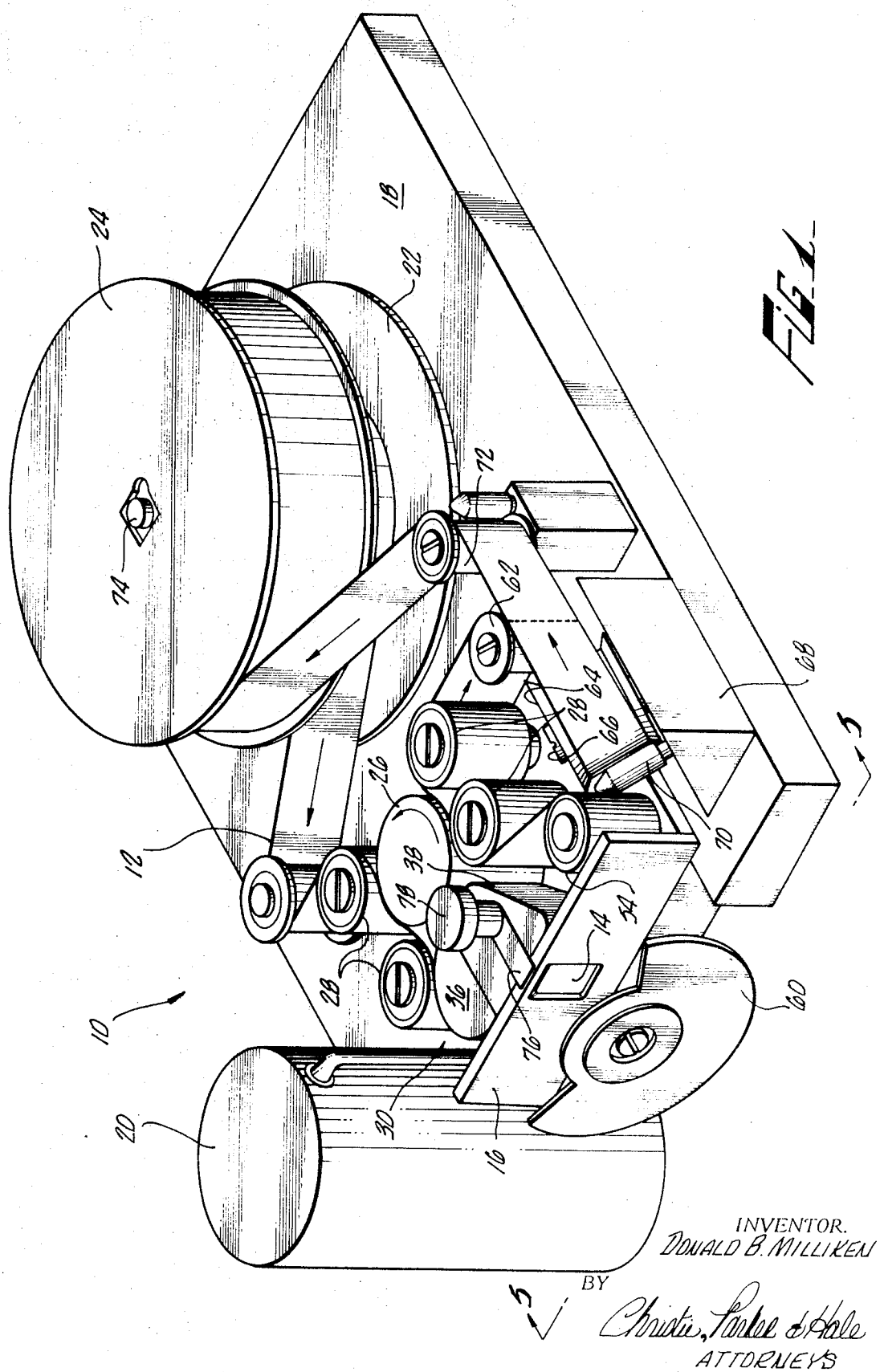
FIG. 1 is a perspective view of a film transport mechanism constructed in accordance with the present invention.

Referring to FIG. 1, a transport mechanism 10 for intermittently transporting a film 12 past an aperture 14 in an aperture plate 16 is mounted on a mounting plate 18. A motor, such as an electric motor 20, drives the mechanism through a suitable gear train (not shown) mounted on the underside of mounting plate 18.

The film is stored on a first reel 22 and is transported through the mechanism 10 to a second reel 24 which is coaxially mounted adjacent the first reel and spaced apart from the mounting plate. The electric motor rotates the second reel 24 to take up any film that is discharged by the transport mechanism.

The transport mechanism includes a sprocket 26 which withdraws film from the first reel 22 and moves it towards the aperture 14 and which also engages the film after it has passed the aperture and discharges it to the second reel 24. The sprocket is driven by the electric motor and rotates continuously in a counterclockwise direction, as viewed in FIG. 1. A plurality of guide rollers 28 are disposed adjacent the sprocket and maintain the film 12 engaged by the sprocket. The guide rollers are freely rotatable about shafts mounted in the plate 18.

Referring to FIGS. 1 and 2, the intermittent motion portion 30 of the transport mechanism 10 includes a base 32 secured to the mounting plate 18 and provided with a register pin 34. The base 32 is spaced from the aperture plate 16 and mounts first and second guide blocks 36 and 38. The guide blocks define a guide surface 40 which is perpendicular to an axis of the aperture 14 and past which the film is transported.

The first guide block includes a relieved portion 42 to provide space for an eccentrically mounted head or cam 44. A shaft 48 is rotatably mounted in an aperture 46 of the base 32. It is preferably integrally constructed with the cam 44 and is driven by the electric motor 20 through a suitable gear train (not shown). The cam and the shaft are arranged so that a portion 50 of the cam which is farthest removed from the center of the shaft projects outwardly past a side 52 of the base 32 a distance which is greater than the distance which register pin 34 projects past that side.

Also mounted in an aperture of the base 32 is a crank or second cam 54 which is eccentric relative to its mounting shaft 56. The second shaft is driven by the electric motor likewise through a gear train in synchronization with cam 46. It is positioned behind the guide surface 40 of the blocks 36 and 38 such that the film is guided backwards from that surface. The second cam includes a freely rotatable roller 57 to prevent sliding motion between the second cam and the film when the two move relative to each other.

The aperture plate 16 preferably includes a pair of rollers 58 which are positioned opposite the register pin 34 and the first cam 44. Mounted adjacent the aperture plate 16 is a rotary shutter 60 which is also driven by the electric motor and which is synchronized with both the first and the second cams 44 and 54 as hereinafter described.

Referring to FIGS. 1 and 5, the film being discharged by the sprocket 26 is guided over a guide roller 62 and then looped in a spiral over a climbing loop roller 64 to offset the edge of the film from a plane aligned with the first reel 22 to a plane aligned with the second reel 24. The climbing loop roller is rotatable about a shaft 66 which is inclined, preferably at no more than 45°, to the limit the twisting to which the film is subjected, relative to the axis of the reels. The shaft is mounted on a suitable support block 68. Also mounted on the support block is a guard 70 to maintain the film adjacent the roller 64 during sudden stops or while the apparatus is de-energized. A suitable guide roller 72 is mounted to align the film with the second reel 24 and to permit that reel to take film up as it is discharged by the sprocket. The climbing loop roller is arranged such that the film disposed on it moves in a straight line without any side components in its motion to reduce friction, heat build-up and possible damage to the film passing over it. This is accomplished by arranging guide rollers 62 such that portions of the film between them and the climbing loop roller 64 are twisted an amount equal to the angular inclination of shaft 66. The width of the roller 64 is therefore about equal to the width of the film.

Turning now to the operation of the transport mechanism as used in a motion picture camera, the first reel 22 is first placed over a suitable shaft 74 mounted on the plate 18. A length of film is threaded past the guide rollers 28, into engagement with the sprocket 26 and into the space between the guide surface 40 of the blocks 36 and 38 and the aperture plate 16. The remainder of the film is looped past the other side of the sprocket, over the climbing roller 64 and into engagement with the second reel 24. To maintain the film in the space between the aperture plate 16 and the guide surface 40, a flat guard 76 is secured to the block 38 by a suitable thumb screw 78.

Aligned with the axis of the aperture 14 is an optic 80 (schematically shown in FIG. 3) extending past a housing 82 which encloses the plate 18, the mechanism 10 and film 12. The shutter 60 rotates in synchronization with the drive mechanism. During part of its rotational movement it permits the light to pass between the optic and the film. While the optic is closed by the shutter, the film is advanced a predetermined length equaling the height of one picture frame. This motion takes place in rapid successions. For example, while conventional motion picture cameras move about sixteen frames per second past the aperture 14, high performance cameras for use in scientific research may move as many as five-hundred frames per second past the aperture. While the optic is open, however, the film adjacent the aperture must be stationary to obtain a sharp image.

During the time the optic is open, the register pin 34 of the base 32 engages a perforation (not shown) adjacent an edge of the film. Once the optic is closed the first cam 44 is rotated into the position in which it moves the film away from the register pin towards the rollers 58 mounted in the aperture plate 16. The disengaged film forms an arc between the two rollers and is now free to be transported to place a new frame adjacent the aperture 14. After the first cam disengaged the pin 34 and the film 12, the eccentrically mounted roller 57 of the second cam 54 pushes outwardly on the film, causing it to be pulled past the aperture 14. See FIG. 4.

If the perforations in the film are spaced at frame intervals, the first cam 44 can be constructed to retract as soon as the second cam commences the forward movement of the film. Otherwise, the first cam retracts when the perforation which must be engaged by pin 34 to correctly position the film approaches the pin. After retraction of the first cam, the film contacts the index pin 34 which registers the first perforation reaching it, thereby arresting the film in a proper position. Forward movement of the film is now impossible and the optic is opened to expose another picture.

While the just described intermittent transport of the film past the aperture takes place, the sprocket 26 rotates continuously. Thus, while the film is stationary adjacent the aperture 14, additional length of film is advanced towards the register pin 34, causing a loop to form adjacent the rounded portion of block 36. This loop is shown in FIG. 3. At the same time, the opposite side of the sprocket continuously withdraws film from the space between it and the register pin. The second cam 54 is given a configuration to permit this continuous withdrawal of film by the sprocket without subjecting the film to tension which might cause it to break. FIG. 3 shows in phantom lines a position of the second cam shortly after the register pin 34 engaged a perforation in the film. While the film is so registered and prevented from moving past the aperture, the second cam rotates permitting that length of film which is being withdrawn by the sprocket to become shorter.

Thus, the amount of film between the two sides of the sprocket remains constant. To eliminate the need for close tolerances of the second cam, the adjacent guide roller 28 is adjustable by moving the position of its axis on mounting plate 18. It is exactly positioned when the apparatus is assembled so that the second cam 54 advances the film while the latter is disengaged from pin 34 and does not subject the film to tension while the pin engages the film.

Depending on the stage of the cycle, an excess length of film required for the intermittent movement is disposed on one or the other side of the pin 34. Just prior to the intermittent transport step, all excess length is adjacent the rounded portion of block 36 and there forms a loop. Immediately after the intermittent motion step, the length is disposed adjacent the second cam 54 in the position shown in phantom lines in FIG. 3, and the film is closely adjacent the rounded portion of block 36, as shown in FIG. 4. While the film is engaged by pin 34, the excess length is withdrawn from adjacent the second cam and advanced to adjacent the block 36.

The flexibility of the film causes it to naturally take a straight position adjacent the guide surface 40. The position of the second cam 54, which is set back from the guide surface, biases the film towards the guide surface and therefore the register pin 34. This assures that the pin engages the next perforation passing it after the film engaging portion 50 of the first cam 44 has been retracted even if the advancing steps take place in rapid succession. High speed operation of the transport mechanism is made possible by the unidirectional rotary motion of all component parts as well as by the rolling engagement of the film with the moving components of the transport mechanism. As is well known, the rolling engagement of parts causes substantially less friction and heat build-up than a sliding engagement.

The further path of the exposed film, which is discharged by the sprocket 26 at a constant rate, takes it past the guide roller 62 and over the climbing loop roller 64 to the second reel 24. Between the guide roller 62 and the climbing roller 64, the film twists 45° if the roller's axis is inclined by 45°, as shown in FIG. 5.

If this intermittent motion apparatus, described in conjunction with its use in a motion picture camera, is used on a motion picture projector, a projection lamp (not shown) is placed on the side of the film opposite from the guide plate 16. The guide block 38 then includes an aperture (not shown) through which light from the lamp can pass to the film and through the aperture 14 to the optic 80. The transport mechanism 10 can, of course, also be used to intermittently move perforated tape or band material other than film for whatever purpose it may be required without departing from this invention.

I claim:

1. Apparatus for intermittently advancing a film strip having uniformly spaced perforations therein, the apparatus comprising guide means for the film forming a loop of constant length, means for continuously feeding film into the loop, means for continuously withdrawing film from the loop at the same rate, means positioned within the loop defining a film guiding surface engaging the film at an intermediate portion of the loop and providing two slack regions of film within the loop on either side of said guiding surface, a pin fixedly secured to and projecting from the film guiding surface to engage a perforation on the film, a first rotating eccentric cam having a cylindrical surface engaging the surface of the film adjacent said pin, rotation of the cam causing the cylindrical surface of the cam to urge the film away from the pin, the cam rotating in a direction to urge the film through frictional engagement of the cam with the film surface in the direction of film advance by said feeding means, a second rotating eccentric cam having a cylindrical surface engaging the surface of the film in the slack loop region downstream of the pin, the first and second eccentric cams being in fixed spaced relation and rotating continuously in synchronism with each other, the angular relation between the two cams being such that the second cam enlarges the associated slack region at the same time the first cam disengages the film and the pin.

2. Apparatus as defined in claim 1 further including a pair of closely spaced rollers positioned on the opposite side of the film from the first cam, and normally spaced from and out of contact with the film, the first cam moving the film into engagement with the two rollers in one angular position of the cam to form a slight loop in the film between the rollers when the first cam passes through said angular position, the pin projecting toward the film at a position intermediate the two rollers, the slight loop formed in the film causing it to disengage from the pin.

References Cited

UNITED STATES PATENTS

| | | | |
|---|---|---|---|
| 622,451 | 4/1899 | Depue | 352—185 |
| 1,548,960 | 8/1925 | Stuber | 352—156X |
| 1,891,262 | 12/1932 | Hayden | 352—156X |
| 3,247,126 | 4/1966 | Palmer | 352—184 |
| 3,408,144 | 10/1968 | Cowan | 352—184X |

FOREIGN PATENTS

| | | | |
|---|---|---|---|
| 580,977 | 11/1924 | France | 352—185 |

JOHN M. HORAN, Primary Examiner

M. H. HAYES, Assistant Examiner

U.S. Cl. X.R.

352—185